US007338688B2

(12) United States Patent
Wang et al.

(10) Patent No.: US 7,338,688 B2
(45) Date of Patent: Mar. 4, 2008

(54) PROTECTIVE PIPE AND TANK LININGS

(75) Inventors: Hsien-Chang Wang, Bellaire, TX (US); Wai Keung Wong, Wezembeek-Oppem (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/476,548

(22) PCT Filed: Apr. 8, 2002

(86) PCT No.: PCT/US02/10895

§ 371 (c)(1),
(2), (4) Date: Oct. 31, 2003

(87) PCT Pub. No.: WO02/098984

PCT Pub. Date: Dec. 12, 2002

(65) Prior Publication Data

US 2004/0131814 A1 Jul. 8, 2004

Related U.S. Application Data

(60) Provisional application No. 60/295,760, filed on Jun. 4, 2001.

(51) Int. Cl.
*B05D 3/02* (2006.01)
(52) U.S. Cl. ............... 427/387; 427/230; 427/372.2; 427/385.5; 427/388.2; 427/388.4
(58) Field of Classification Search ............... 427/230, 427/372.2, 385.5, 387, 388.2, 384.4
See application file for complete search history.

(56) References Cited

U.S. PATENT DOCUMENTS

| 2,901,458 | A | | 8/1959 | Banes et al. ............... 260/45.5 |
|---|---|---|---|---|
| 4,245,060 | A | | 1/1981 | Powers et al. ............... 525/256 |
| 4,756,974 | A | | 7/1988 | Romberg ................. 428/423.9 |
| 5,013,793 | A | | 5/1991 | Wang et al. ................. 525/195 |
| 5,051,477 | A | | 9/1991 | Yu et al. ..................... 525/194 |
| 5,125,921 | A | | 6/1992 | Duschek ..................... 604/415 |
| 5,163,919 | A | | 11/1992 | Thijs et al. ................. 604/199 |
| 5,175,032 | A | * | 12/1992 | Steele et al. ............... 428/34.9 |
| 5,279,606 | A | | 1/1994 | Haber et al. ................. 604/403 |
| 5,340,118 | A | | 8/1994 | Jacobson et al. ........... 273/411 |
| 5,356,950 | A | | 10/1994 | White et al. ................. 522/116 |
| 5,428,085 | A | | 6/1995 | Burel et al. ................... 524/59 |
| 5,656,112 | A | | 8/1997 | Kuroda ......................... 156/69 |
| 5,665,823 | A | | 9/1997 | Saxena et al. ............. 525/106 |
| 5,698,640 | A | | 12/1997 | Duvdevani et al. ...... 525/333.4 |
| 5,707,701 | A | | 1/1998 | Saitoh et al. ............. 428/36.91 |
| 5,782,815 | A | | 7/1998 | Yanai et al. ................. 604/218 |
| 6,060,552 | A | | 5/2000 | Kaido ......................... 524/492 |
| 6,380,316 | B1 | * | 4/2002 | Bahadur et al. ............. 525/263 |
| 6,482,894 | B1 | * | 11/2002 | Chang et al. ............. 525/191 |

FOREIGN PATENT DOCUMENTS

| EP | 0 775 719 A2 | 5/1997 |
|---|---|---|
| WO | WO 99/31178 | 6/1999 |
| WO | WO 00/52072 | 9/2000 |
| WO | WO 00/52073 | 9/2000 |

* cited by examiner

*Primary Examiner*—Michael Miggins
(74) *Attorney, Agent, or Firm*—Leandro Arechederra, III; Nancy I. Krawczyk

(57) ABSTRACT

Protective liners or coatings for metal conduits, pipes and tanks subjected to corrosive liquids are disclosed. The liners comprise a composition containing a silylated copolymer of, for example, isobutylene and para-methylstyrene, which are curable by contact with moisture.

11 Claims, No Drawings

PROTECTIVE PIPE AND TANK LININGS

CROSS REFERENCE TO RELATED APPLICATIONS

This application is a National Stage Application of International Application No. PCT/US02/10895, filed Apr. 8, 2002, which claims the benefit of Provisional Application No. 60/295,760, filed Jun. 4, 2001.

FIELD OF THE INVENTION

The present invention relates to protective linings for metal pipes and tanks that are used in, for example, chemical plants, storage facilities and transportation vehicles.

BACKGROUND

Conduits and storage/supply tanks are generally fabricated from steel and are often subjected to corrosive environments occasioned by contact of their inner surfaces with highly acidic or alkaline aqueous solutions.

Protection in such systems may be provided by lining the inside surfaces of these tanks and conduits with a resinous or cured rubber composition, which is relatively resistant to attack by such chemicals and also relatively water resistant.

In a brochure entitled "Corrosion Protection of Chemical Plant Equipment using a Bromobutyl Rubber Formula which Vulcanizes at Ambient Temperature" by C. A. Moakes and published by Polysar Corp., there is disclosed a tank or pipe lining material comprising a bromobutyl rubber formulated with curing agents (Red Lead, ethylene thiourea and a sulfur containing accelerator) which is stated to vulcanize at ambient temperature after a period of 6 or more weeks. The lining material is formulated by mixing all ingredients except the curing agents in an internal mixer, adding the curatives during a subsequent milling step and calendering the material on a roll mill to form sheets having a gauge of about 1-5 mm. These sheets are not to be stored for more than one week to avoid the risk of pre-vulcanization prior to use.

The unvulcanized sheets or liners are then applied in sections to the interior surfaces of large tanks or pipes using a primer/tie coat system to enhance adhesion of the butyl rubber sheets to metal surfaces such as steel.

The problem with this system is that it can not be stored for very long because the material may not be workable after vulcanization begins to occur, while at the same time it may take 6 weeks up to 6 months for the material to vulcanize sufficiently after application so that the material will offer the water resistant and corrosion resistant properties afforded by the cured rubber. This means that the tanks and conduits can not be used in the plant for long periods of time after they are fabricated; otherwise the lining may swell due to excess water absorption of the undervulcanized liner material.

While there are disclosures of polymers suitable for use as sealants, such as WO 99 31178; WO 00 52072; WO 00 52073; and U.S. Pat. No. 5,707,701, none have been demonstrated to be suitable for a tank liner. In particular, there has been no disclosure of a polymer suitable for a liner having a practically rapid (less than two weeks) cure time, sufficient flexibility (to allow the liner to be manipulated), and at the same time excluding curatives such as sulfur and sulfur-based accelerators that may leach into the materials being stored in the tank. What is needed is a tank liner that cures more rapidly while avoiding any leaching of materials into the materials being stored.

SUMMARY OF THE INVENTION

The invention provides for a protective liner coating for use with structures such as metal tanks, conduits or pipes, particularly steel structures, which protects the contact surfaces of such structures from the corrosive action of liquids, particularly acidic or alkaline aqueous solutions, which they contain or transport.

More particularly, the invention provides a metal structure comprising a pipe, conduit or tank, the structure having an outer and an interior surface, at least a portion of the interior surface being coated with a protective elastomeric layer bonded thereto, the layer comprising a composition comprising a silylated isobutylene copolymer which is the product of contacting:

a) an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer;

b) a silane of the general formula:

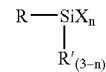

wherein R is an alkenyl group having 2 to 10 carbon atoms, R' is independently selected from hydrocarbon or halogenated hydrocarbon groups, wherein R' contains no aliphatic unsaturation in one embodiment; X is a silicon-bonded hydrolyzable group selected from alkoxy, acyloxy, ketoxime, amino, amido, aminoxy or alkenyloxy groups, and n is 2 or 3, and c) a free radical generating agent.

The invention also provides a method for forming a protective layer on the interior surface of a metal structure comprising a pipe, conduit or tank comprising:

i) providing a composition comprising a silylated isobutylene copolymer which is the graft reaction product of:

a) an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer;

b) a silane of the general formula:

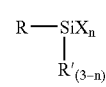

wherein R is an alkenyl group having 2 to 10 carbon atoms, R' is independently selected from hydrocarbon or halogenated hydrocarbon groups, wherein R' contains no aliphatic unsaturation in one embodiment; X is a silicon-bonded hydrolyzable group selected from alkoxy, acyloxy, ketoxime, amino, amido, aminoxy or alkenyloxy groups, and n is 2 or 3, and c) a free radical generating agent;

ii) mixing the silylated copolymer with a condensation catalyst which promotes cross linking of the silylated copolymer in the presence of moisture;

iii) applying the composition of step (ii) to the interior surface of the structure to form a coating layer;

iv) contacting the layer from step (iii) with sufficient moisture to at least partially crosslink the composition.

The protective liner compositions of the invention offer several advantages over the liner compositions of the prior art. The composition can be prepared and stored over long periods of time provided that moisture is kept out, whereas prior art compositions containing curatives will provide only relatively short storage periods before crosslinking commences. Also, the silane/moisture crosslinking permits control of the degree to which crosslinking takes place precisely at that stage of mechanical performance when, for example, a calendered sheet of the composition will be used. After applying a sheet (or layer) to the structure surface, further crosslinking needs to take place to prevent swelling of the liner due to water absorption. This further crosslinking occurs as the result of contact of the liner surface with aqueous fluids, and slowly progresses inwardly, thereby limiting the swelling of the lining because diffusion of water into the lining will be slowed down.

DETAILED DESCRIPTION OF THE INVENTION

The silylated copolymers of the invention may be characterized as the addition product of an isobutylene copolymer radical created by contact of the copolymer with a free radical generating agent and an olefinically unsaturated, hydrolyzable silane wherein the silane adds to the polymer backbone to produce a silane grafted or silane modified copolymer product. In particular, an embodiment of the invention is tank or pipe liner which is the product of contacting an isobutylene-vinyl aromatic based polymer with a silane cross-linking agent.

The polymers suitable for the present invention include copolymers containing at least 80 wt % of isobutylene and from 0.1 up to 20 wt % of at least one vinyl aromatic monomer. Preferred vinyl aromatic monomers are monovinyl aromatics such as styrene, α-methylstyrene, alkyl-substituted styrenes such as t-butylstyrene and para-alkyl substituted styrenes wherein the alkyl group contains from 1 to 4 carbon atoms, more preferably para-methylstyrene.

One embodiment of the copolymers include elastomeric copolymers comprising isobutylene and para-methylstyrene and containing from 0.1 to 20 wt % of para-methylstyrene. These copolymers (hereinafter referred to as IPMS) have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than 5, more preferably less than 3.5, and a glass transition temperature ($T_g$) of below −50° C. Further, the copolymers are characterized by a Mooney Viscosity (ML 1+8) at 100° C. of from 35 to 55 in one embodiment, and from 38 to 50 in another embodiment.

In another embodiment, the isobutylene copolymer of the present invention may be terpolymer of a $C_4$ to $C_7$ isoolefin and a para-alkylstyrene and halogenated para-alkylstyrene. The percentages of para-alkylstyrene and halogenation can vary widely. Different applications may require different formulations. Generally, the copolymer of the present invention will have from 2 wt % to 20 wt % para-alkylstyrene (preferably para-methylstyrene). In addition, the copolymer of the present invention will have from 0.20 mol % to 3.0 mol % of a halogenated compound, such as para-bromomethylstyrene.

Preferably, low levels of either bromine and/or para-alkylstyrene are used. In a preferred embodiment, para-alkylstyrene (preferably para-methylstyrene) comprises from 3 wt % to 15 wt % of the copolymer. More preferably, it is from 4 wt % to 7.5 wt % of the copolymer. In another preferred embodiment, a halogenated compound, such as bromo para-methylstyrene comprises from 0.20 mol % to 3.0 mol % of the copolymer. More preferably, it comprises from 0.50 mol % to 1.5 mol % of the copolymer. Most preferably, it is from 0.5 mol % to 1.0 mol % of the copolymer.

These copolymers may be prepared by conventional cationic polymerization of the monomer mixture using a Lewis Acid catalyst and are more particularly disclosed in U.S. Pat. No. 5,162,445. A commercial embodiment of this type of copolymer is XP-50 Elastomers and EXXPRO™ Elastomers (ExxonMobil Chemical Company, Houston Tex.).

Another category of isobutylene copolymer which may be used is a copolymer of 85 to 99.5 wt % of isobutylene with 15 to 0.5 wt % of $C_4$ to $C_{14}$ conjugated diene. Such copolymers are well known in the art and are also referred to as "butyl rubber." Typical conjugated dienes may be illustrated by isoprene, butadiene, 2,3-dimethyl butadiene, piperylene, 2,5-dimethylhexa-2,4-diene, cyclopentadiene, cyclohexadiene and methylcyclopentadiene. It is preferred that the copolymer is a copolymer of isobutylene with isoprene, the latter monomer preferably being present at a level of 0.5 to 4 wt %, most preferably at 2 to 3 wt %.

Typically, the isobutylene copolymers have a number average molecular weight ($M_n$) of 1,000 to 500,000, preferably greater than 50,000, more preferably 100,000 to 300,000, before being modified according to the method described below.

Halogenated isobutylene copolymers containing from 0.1 to 5 wt % bromine or chlorine may also be used for the purposes of this invention, although the presence of halogen is not necessary for the purposes of curing the copolymer.

The unsaturated silane which is grafted to the copolymer backbone has the general formula:

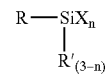

wherein R is an alkenyl group having 2 to 10 carbon atoms which may be illustrated by vinyl, allyl, butenyl, pentenyl, hexenyl, heptenyl, octenyl and decenyl. Either straight chain or branched groups may be used but the unsaturation is a vinylic type (i.e., having a terminal unsaturated moiety; an alkenyl) in one embodiment. Preferred alkenyl groups are vinyl, allyl and hexenyl. R' may be independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl, hexyl, octyl, decyl and dodecyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; halogenated alkyl groups having 1 to 20 carbon atoms, such as 3,3,3-trifluoropropyl and chloromethyl; and halogenated aryl groups having 6 to 12 carbon atoms, such as chlorobenzyl or chloronaphthyl. X in the above formula is a silicon-bonded hydrolyzable group selected from alkoxy, acyloxy, ketoxime, amino, amido, aminoxy or alkenyloxy groups, and preferably contains no more than 6 carbon atoms. Specific examples of such hydrolyzable groups include methoxy, ethoxy, propoxy, butoxy, acetoxy, propionoxy, —ON=C(ME)$_2$, —ON=C(Et)(Me), —ON=C(Ph)$_2$, —NH(Me), —NH(Et) and —NH(Ph)$_2$, wherein Me, Et and Ph hereinafter denote methyl, ethyl and phenyl groups, respectively.

Preferably, X is an alkoxy group having 1 to 4 carbons, most preferably a methoxy group. The subscript n is an integer having a value of 2 or 3. Desirable silanes are methylvinyldimethoxysilane, vinyltrimethoxysilane and hexenyltrimethoxysilane.

Radiation such as an electron beam generator or an organic compound may be used to generate free radicals. The type of free-radical generator used in the method of the present invention is not specifically limited. The organic component generates free radicals upon heating and may be selected from any of the known azo or diazo compounds, such as 2,2'-azobisisobutyronitrile and phenyl-azo-triphenylmethane. Preferably, the free-radical generator is selected from organic peroxides such as hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides and alkyl monoperoxydicarbonates.

Specific examples of suitable peroxides which may be used include benzoyl peroxide, t-butyl peroxy o-toluate, cyclic peroxyketal, t-butyl hydroperoxide, t-butyl peroxypivaiate, lauroyl peroxide and t-amyl peroxy 2-ethylhexanoate, 1,3-bis(t-butylperoxyisopropyl) benzene, 2,2,4-trimethylpentyl-2-hydroperoxide, 2,5-bis(t-butylperoxy)-2,5-dimethylhexyne-3, cumyl hydroperoxide, t-butyl peroxybenzoate and diisopropylbenzene mono hydroperoxide. For the purposes of the invention, it is preferred that the peroxide is selected from dicumyl peroxide and di-t-butyl peroxide.

In order to produce a modified copolymer according to the instant invention, the copolymer is contacted with the silane in the presence of a free-radical generator in a suitable reaction zone and under reaction conditions to produce a graft of the silane along the polymer backbone. Where the copolymer contains a vinyl aromatic monomer, for example, para-methylstyrene, it is believed that most of the grafting takes place on the aromatic ring and thus little degradation of the isobutylene chain segments takes place via chain scission. Where the copolymer contains a conjugated diene (butyl rubber), there is some degradation of the chains occasioned by chain scission during the grafting process leading to a reduction in the Mn of the graft polymer product as compared with the starting polymer product.

The contacting of products together (or "grafting reaction") may be conducted in the absence of a diluent or in the presence of a diluent. Where a diluent is present in the reaction zone, suitable diluents include saturated aliphatic hydrocarbons, aromatic hydrocarbons, and perhalogenated hydrocarbons.

The grafting reaction to produce the grafted polymer may also be conducted in the absence of a diluent and in the bulk phase, wherein the copolymer is in the molten state. The reaction temperature is chosen to be appropriate for the free radical generator used.

Suitable conditions for contacting the various components include a temperature ranging from about 0° C. to about 300° C. The reaction temperature will vary according to the free radical generator used. When an organic peroxide is used suitable temperatures range from about 25° to about 250° C. Higher temperatures may be used for other types of free radical initiators. When the reaction is conducted in the presence of a diluent, such as in solution processes, the reaction temperature will generally be below 150° C. For melt phase processes (i.e., bulk phase processes), the reaction temperature may range from about 25° C., such as in conventional electron beam irradiation equipment to about 250° C., such as in polymer mixing equipment. The process for producing the grafted polymers of the present invention may be conducted as a batch process or as a continuous process.

The contacting of the various components is performed in a suitable reaction zone which may be a polymer mixing device such as a Banbury™ mixer, a single or multiple screw extruder and the like for molten polymers or a glass flask, metal tank or tube when the process is conducted in the presence of a diluent.

The molar ratio of free radical compound vs. silane used in the grafting reaction may range from 0.001:1 to 1:1, preferably from 0.01:1 to 0.1:1.

Desirably, the molar amount of silane, expressed in mmoles per gram, in the contacting zone may be 1 to 10 times the molar amount of these components as is desired in the final grafted copolymer. Thus, when the molar amount of the silane in the grafted copolymer is 0.05 mmoles per gram of product polymer, the amount of silane introduced in the reaction zone is suitably from 0.05 to 0.5 mmoles per gram of the total of the copolymer and silane present in the reaction mixture.

Preferably the grafting reaction is conducted such that the resulting silylated copolymers contain an average of from 0.5 to 15 moles, and more preferably from 1 to 5 moles of hydrolyzable silyl groups per polymer chain, as measured by $^1$HNMR.

The silylated copolymers of the present invention may be cured by contact with or mixing with water (moisture), preferably in the presence of a silanol condensation catalyst. By contacting with moisture or water, it is meant that the copolymer composition is contacted uniformly to liquid water, a solution containing water (aqueous solution), or gaseous water at any suitable level to effectuate the cure. For example, in one embodiment, typical atmospheric levels of moisture are suitable levels of gaseous water to effectuate a cure, whereas liquid water is suitable in another embodiment. Suitable condensation catalysts include metal carboxylates such as dibutyltin dilaurate, stannous octoate, stannous acetate, lead naphthenate and zinc octoate; organic metal compounds such as titanium esters and chelates such as tetrabutyl titanate; organic bases such as ethylamine, hexylamine and piperidine; and acids such as mineral acids and fatty acids. Preferred catalysts are organic tin compounds such as dibutyltin dilaurate and stannous octoate. The amount of catalyst employed will generally range from 0.1 to 10 parts by weight per 100 parts by weight of silylated copolymer.

Crosslinking of the copolymers is via condensation reaction between silane molecules grafted onto different polymer chains. The alkoxy group of the grafted silane is first hydrolyzed by water to form hydroxyl groups. Condensation reactions between hydroxyl groups then takes place to form Si—O—Si crosslinking, particularly in the presence of condensation catalyst. Thus, conventional curatives such as Zinc oxide, sulfur or sulfur-containing accelerators are not necessary to effect curing of the composition.

The composition may also contain other additives known in the rubber formulation art such as fillers and processing oils. Suitable fillers include carbon black, talc, silica and the like. Suitable processing oils include paraffinic or aromatic oils. The composition may also comprise a mixture of one or more non-silylated isobutylene polymers or copolymers, such as isobutylene/para-methylstyrene or isoprene copolymers, which may or may not be halogenated. Suitable amounts of conventional curatives for these curable copolymers may also be included.

In one embodiment of the invention, conventional curatives such as zinc oxide, sulfur or sulfur-containing accelerators are not necessary to effect curing of the composition, but may be present in an alternative embodiment. Thus, in one embodiment of the invention, these additives—metal oxides, sulfur, sulfur-containing accelerators—are absent from the composition, and present in the composition/elastomeric article to less than 0.5 wt % (combined) in another embodiment. In another embodiment, processing oils such as parraffinic, naphthenic, aromatic, mineral and other oils are substantially absent from the composition used to make the protective layer for liners, etc., meaning that they are present, if at all, to an extent no greater than 5 phr in one embodiment, and less than 3 phr in another embodiment, and less than 1 phr in yet another embodiment, and not present to a measurable extent in another embodiment.

One embodiment of the invention is a metal structure comprising a pipe, conduit or tank, the structure having an outer and an interior surface, at least a portion of the interior surface being coated with a protective elastomeric layer bonded thereto, the layer comprising a composition of a silylated isobutylene copolymer which is the product of contacting: an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer; a silane of the general formula:

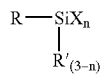

wherein R is an alkenyl group having 2 to 10 carbon atoms, R' is independently selected from hydrocarbon or halogenated hydrocarbon groups, wherein R' contains no aliphatic unsaturation in one embodiment; X is a silicon-bonded hydrolyzable group selected from alkoxy, acyloxy, ketoxime, amino, amido, aminoxy or alkenyloxy group, and n is 2 or 3, and a free radical generating agent.

Another embodiment of the invention is a metal structure comprising a pipe, conduit or tank, the structure having an outer and an interior surface, at least a portion of the interior surface being coated with a protective elastomeric layer bonded thereto, the layer consisting essentially of an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer; a silane of the general formula:

wherein R is an alkenyl group having 2 to 10 carbon atoms, R' is independently selected from hydrocarbon or halogenated hydrocarbon groups, wherein R' contains no aliphatic unsaturation in one embodiment; X is a silicon-bonded hydrolyzable group selected from alkoxy, acyloxy, ketoxime, amino, amido, aminoxy or alkenyloxy group, and n is 2 or 3, and a free radical generating agent. The copolymer, silane, and free radical generating agent are contacted in the presence of moisture or water for 9 days or less in one embodiment, for 11 days or less in another embodiment, for 15 days or less in yet another embodiment, from 1 hr to 30 days in one embodiment, and from 5 to 15 days in another embodiment, and from 9 to 11 days in yet another embodiment to effectuate a cure suitable for allowing the storage of materials within the tank lined with the present composition.

This and other embodiments may include variations of the copolymer, wherein the para-methylstyrene is present in the copolymer from 5 to 7.5 wt % of the copolymer in one embodiment, and wherein 0.5 to 1.5 mol % of the para-methylstyrene derived units are halogenated in another embodiment.

Where the composition is to be applied as a liner in sheet form, it may be processed by mixing the silylated copolymer and other additives in a suitable internal mixer, for example, a Banbury™ mixer, on extruder, a mill mixer or other suitable mixing device at temperatures in the range of about 140 to 240° C. The material is then sheeted out using a roll mixer or calendar with roll temperatures of about 50-100° C. to form shaped sheets having a thickness of about 1 to 10 millimeters, more preferably about 2-7 millimeters.

These sheets may be cut to any desired size for application to the metal surface. As long as these sheets are insulated from contact with moisture, no crosslinking will take place. It may be desirable to provide partial crosslinking of the surface of the sheets to facilitate handling, in which case the sheets may be exposed to a humid atmosphere or steam for a short period of time prior to storage or prior to application to the metal surface.

The composition may also be applied to metal surfaces by spraying, painting or roller coating where the composition is dispersed in suitable anhydrous solvent or where the molecular weight of the polymer is sufficiently low that it is liquid. Liquid polymers having an Mn of from 500 to 5,000 can be sprayed on the metal surfaces without the presence of solvent.

Metal conduits, pipes or tank structures which may be lined with the copolymer composition may be made from metals such as steel or aluminum, including galvanized or stainless steel. To enhance adhesion, the metal surfaces are preferably sandblasted and degreased prior to application of the protective layer.

In some cases, it is desirable to paint the surfaces of the metal structure with an adhesive and/or tie coat which enhances the adhesion of the liner coating to the metal. Suitable adhesives include those containing bromobutyl rubber, epoxidized diolefin polymers, polychloroprene polymers or terpene resins which are dispersed in suitable organic solvents. Suitable rubber to metal adhesives are commercially available from the Lord Corporation under the Chemlok™ trademark.

The following example is illustrative of the invention.

EXAMPLE

A steel tank was lined with strips of 5 mm thick silylated copolymer comprising a copolymer of isobutylene and 5 wt % of para-methylstyrene mixed with 0.59 wt % of dibutyl tin dilaurate condensation catalyst. The silylated copolymer was prepared by mixing in a high shear extruder 96.8 parts by weight of the copolymer, 0.2 parts by weight di-t-butyl peroxide (dispersion in mineral oil) and 3 parts by weight of vinyltrimethoxy silane and heating the mixture under high shear conditions at a temperature in the range of about 160° C. to 220° C. The resulting silylated copolymer had a Mn of 98,100, a Mw of 230,000 and a polydispersity value of 2.35. The content of grafted vinyl trimethoxy silane was 0.59 wt %.

The extruded material was compounded on calendar rolls at 50° C. at which time the dibutyl tin dilaurate catalyst was added. The composition was sheeted out into sheets having a thickness of about 1 mm, which were laid up to form sheets having a thickness of 5 mm.

Samples were adhered to a steel tank and the tank was filled with water. After immersion in water at 50° C. for 11 days, the composition was crosslinked as reflected by % extractables and volume increase data.

Samples of the sheet material prepared above were also cut to form shaped discs. Curing was then conducted by immersing the discs in water at 50° C. for a period of time. The % volume increase and % extractable values in cyclohexane were evaluated to show the degree of cure vs. time, and are shown in Table 1. The data suggests that the higher the degree of crosslinking, the lower the % volume increase and % extractables.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

|  | % Extractable | % Volume Increase |
| --- | --- | --- |
| No Cure | 89, 91 | 6134, 7289 |
| 11 days in water at 50° C. | 45, 24 | 3148, 1434 |
| 25 days in water at 50° C. | 29, 32 | 3142, 3231 |

What is claimed is:

1. A method for forming a protective layer on a metal structure having an interior surface comprising a pipe, conduit or tank comprising the steps of:

i) providing a composition comprising a silylated isobutylene copolymer which is the product of contacting:

a) an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer;

b) a silane of the general formula:

wherein R is an alkenyl group having 2 to 10 carbon atoms, R' is

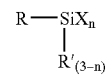

independently selected from hydrocarbon or halogenated hydrocarbon groups which contain no aliphatic unsaturation, X is a silicon-bonded hydrolyzable group selected from alkoxy, acyloxy, ketoxime, amino, amido, aminoxy or alkenyloxy group, and n is 2 or 3, and c) a free radical generating agent;

ii) mixing the silylated copolymer with a condensation catalyst which promotes cross linking of the silylated copolymer in the presence of moisture;

iii) applying the composition of step (ii) to the interior surface of the structure to form a coating layer;

iv) contacting the layer from step (iii) with sufficient moisture to at least partially crosslink the composition.

2. The method of claim 1, wherein the contacting with moisture comprises contacting with water or an aqueous solution.

3. The method of claim 1, wherein the composition is applied by spraying.

4. The method of claim 1, wherein the composition is applied by adhering one or more layers of the composition in the form of preformed sheets.

5. The method of claim 1, wherein the layer has a thickness of from 1-10 millimeters.

6. The method of claim 1, wherein a processing oil comprises less than 5 phr of the protective layer.

7. The method of claim 1, wherein a processing oil comprises less than 1 phr of the protective layer.

8. The method of claim 1, wherein silane is selected from methylvinyldimethoxy silane and vinyltrimethoxy silane.

9. The method of claim 1, wherein sulfur, metal oxides, and sulfur-based accelerators are present in the protective layer to less than 0.5 wt %.

10. The method of claim 1, wherein the moisture contacting is for a period of 11 days or less to effectuate a cure.

11. The method of claim 1, wherein the silylated copolymers contain from 0.5 to 15 moles of hydrolyzable silyl groups per polymer chain as measured by $^1$H NMR.

* * * * *